United States Patent [19]

Kreft

[11] Patent Number: 5,407,060

[45] Date of Patent: Apr. 18, 1995

[54] RESONANT VIBRATING CHAMBER

[75] Inventor: Manfred Kreft, Wetter, Germany

[73] Assignee: Uhde GmbH, Dortmund, Germany

[21] Appl. No.: 125,580

[22] Filed: Sep. 23, 1993

[30] Foreign Application Priority Data

Sep. 24, 1992 [DE] Germany .................. 42 32 010.0

[51] Int. Cl.[6] .............................................. B65G 27/08
[52] U.S. Cl. ............................................................ 198/763
[58] Field of Search ................................ 198/760, 763

[56] References Cited

U.S. PATENT DOCUMENTS 2,830,696 4/1958 Musschoot .................... 198/763
3,032,175 5/1962 Thomas ........................ 198/763

Primary Examiner—Joseph E. Valenza
Attorney, Agent, or Firm—Anderson Kill Olick & Oshinsky

[57] ABSTRACT

A resonant vibrating conveyer is disclosed which has a vibratory drive and spring supports connecting the trough with an intermediate frame which is, in turn, attached to a foundation via springs. The forces transmitted to the foundation are reduced to a minimum while permitting a relatively light-weight construction of the conveyer. This is achieved by arranging first pre-loaded springs with countervibrating masses acting at the point of attachment of second pre-loaded springs between the conveyer trough and the intermediate frame.

18 Claims, 1 Drawing Sheet

RESONANT VIBRATING CHAMBER

FIELD OF THE INVENTION

This invention relates to a resonant vibrating conveyer with a vibratory drive and spring supports, with these springs acting upon an intermediate frame which is, in turn, attached to a foundation via springs.

BACKGROUND OF THE INVENTION

Such vibrating conveyers are used to convey material by means of nonuniform reciprocating motion, the conveyer trough being, in principle, horizontal or near horizontal, whereby inertia forces are transmitted to the material as the trough moves in the forward direction, these forces causing the material to move forward during the reverse motion of the trough, a difference being made, depending on the amplitude of vibration, between simple shaking chutes and vibrating conveyers which are characterized by high vibration frequencies and small amplitudes, thus causing the material to perform a kind of micro-skipping motion.

It is known to equip such conveyer troughs with pre-loaded springs, the vibration being imparted to the conveyer by an eccentric drive at a frequency close to resonance of the natural frequency of the spring/mass system.

It is also known to mount the vibrating conveyers on a frame which is firmly attached to the foundation, the pre-loaded springs being located between the conveyer trough and the base frame, with the result that the induced forces have to be absorbed by the foundation, the disadvantage being that the foundation has to be absolutely rigid, especially in the case of long conveyers.

As a rule, a design of this type is unsuitable if such foundations are not available, e.g. when the vibrating conveyers have to be installed above the roof of a building, etc.

It is further known to provide a vibratory system comprising a conveyer trough and frame, the frame not being attached to the foundation directly but via supporting springs, and the frame acting as the countervibrating mass. When in use, this countervibrating mass vibrates in the opposite phase to the conveyer trough at an amplitude that is in an inverse ratio to the mass of the trough and which depends on the vibration amplitude of the trough. In this case, the vibrating conveyers also have to be of relatively heavy construction. Due to the necessary rigidity of the vibrating mass, there are also limits with regard to the overall length.

SUMMARY OF THE INVENTION

The aim of this invention is to create a solution, whereby the forces transmitted to the foundation are reduced to a minimum whilst allowing a relatively light-weight construction of the vibrating conveyer.

With a vibrating conveyer of the type described above, this aim is achieved by attaching further pre-loaded springs with countervibrating mass to the intermediate frame at the articulated joint between the pre-loaded springs connecting the foundation and intermediate frame.

The invention ensures that, due to the vibrating systems comprising conveyer trough/pre-loaded spring and further pre-loaded spring/countervibrating mass acting upon the same point of the intermediate frame, the intermediate frame is virtually at rest in relation to the foundation, so that the springs supporting the intermediate frame transmit only very minor or no forces to the foundation.

In such an arrangement it is expedient to have the lines of forces of the pre-loaded springs between conveyer trough and intermediate frame act on a common axis with those between the contervibrating mass and intermediate frame, this being likewise embodied in the invention.

In a further embodiment of the invention, the vibratory drive is mounted on the intermediate frame while acting upon the conveyer trough, i.e. the vibratory drive transmits the vibrations directly to the conveyer trough, the countervibrating mass not being excited directly by the drive in counterphase, but indirectly via the pre-loaded springs. This configuration permits the use of a low-power driving motor.

The construction is such that the natural frequency of the two vibrating systems, i.e. intermediate frame/conveyer frame and intermediate frame/countermass, can be adjusted independently of each other. It may be advantageous to set the natural frequency of the countermass slightly above that of the frequency of the vibratory drive, this possibility being likewise embodied in the invention.

An example of the invention is described in more detail below with the aid of the drawing.

DESCRIPTION OF THE PREFERRED EMBODIMENT

Figure 1:
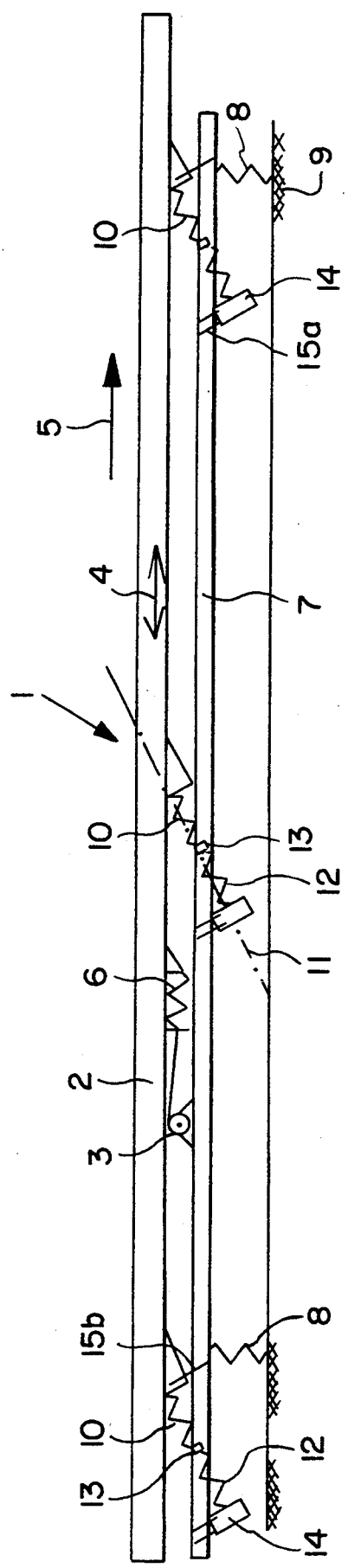
FIG. 1 illustrates schematically a side view of a resonant vibrating conveyer according to the invention.

Vibrating conveyer 1 features a conveying trough 2 which is caused to vibrate in the direction of double arrow 4 by eccentric drive 3 in such a manner as to convey the material on the trough in the direction of arrow 5.

Eccentric drive 3, which is attached to intermediate frame 7, acts upon conveyer trough 2 via spring 6. The intermediate frame is, in turn, attached via supporting springs 8 to foundation 9 not shown in full detail.

As can be seen from the drawing, pre-loaded springs 10 are arranged between conveying trough 2 and intermediate frame 7 and further pre-loaded springs 12 are attached to the intermediate frame acting in the same line as indicated by dot-dash line 11. These pre-loaded springs 12 are attached to the same articulated joint 13 in intermediate frame 7 as pre-loaded springs 10. Counterweights 14 are attached to pre-loaded springs 12 at the ends remote from intermediate frame 7.

Leaf springs 15a and 15b are provided as lateral guides for counterweights 14 with pre-loaded springs 12 and for pre-loaded springs 10, their purpose being to prevent the system from overturning sideways.

A feature not illustrated is the fact that springs 10 and 12 and/or leaf springs 15 are adjustable individually or jointly for the purpose of varying the natural frequencies of the vibrating systems.

By appropriately adjusting pre-loaded springs 10 and 12 acting in the same line 11, it is possible to induce a kind of pulsating motion to the two systems in a manner as to achieve a state in which intermediate frame 7 is virtually at rest, thus transmitting only very minor or no forces at all to foundation 9 via supporting springs 8.

I claim:

1. A resonant vibrating conveyer which comprises:
   a conveyer trough;
   a vibratory drive;
   a plurality of countervibrating masses,
   a foundation;
   an intermediate frame which has an articulated joint;
   a first spring;
   supporting springs;
   first pre-loaded springs, wherein each of said first pre-loaded springs has at least one of said plurality of countervibrating masses associated therewith; and
   second pre-loaded springs,
   wherein said vibratory drive and said supporting springs are attached to said intermediate frame, and wherein said intermediate frame is attached to said foundation via said supporting springs, and wherein at least one of said first pre-loaded springs is attached to said articulated joint of said intermediate frame, and further wherein said second pre-loaded springs connect said conveyer trough to said intermediate frame.

2. The resonant vibrating conveyer of claim 1, wherein lines of force of said first pre-loaded springs and said second pre-loaded springs between said conveyer trough and said intermediate frame and between at least one of said plurality of countervibrating masses and said intermediate frame act on a common axis.

3. The resonant vibrating conveyer of claim 1, wherein said vibratory drive is mounted on said intermediate frame and transmits a vibratory motion to said conveyer trough.

4. The resonant vibrating conveyer of claim 2, wherein said vibratory drive is mounted on said intermediate frame and transmits a vibratory motion to said conveyer trough.

5. The resonant vibrating conveyer of claim 1, wherein natural frequencies of two vibrating systems comprising said intermediate frame and said conveyer trough and said intermediate frame and at least one of said countervibrating masses are adjustable independently of each other.

6. The resonant vibrating conveyer of claim 5, wherein a natural frequency of at least one of said plurality of said countervibrating masses can be adjusted to a frequency slightly above a frequency of said vibratory drive.

7. The resonant vibrating conveyer of claim 1, wherein a vibrating behavior of said conveyer trough and of said plurality of countervibrating masses can be adjusted so that said intermediate frame remains virtually at rest when said conveyer is in use.

8. The resonant vibrating conveyer of claim 2, wherein a vibrating behavior of said conveyer trough and of said plurality of countervibrating masses can be adjusted so that said intermediate frame remains virtually at rest when said conveyer is in use.

9. The resonant vibrating conveyer of claim 3, wherein a vibrating behavior of said conveyer trough and of said plurality of countervibrating masses can be adjusted so that said intermediate frame remains virtually at rest when said conveyer is in use.

10. A resonant vibrating conveyer, which comprises:
    a conveyer trough;
    a vibratory drive;
    a plurality of countervibrating masses;
    a foundation;
    an intermediate frame which has an articulated joint;
    a first spring;
    supporting springs;
    first pre-loaded springs, wherein each of said first pre-loaded springs has one of said plurality of countervibrating masses associated therewith; and
    second pre-loaded springs,
    wherein said vibratory drive and said supporting springs are attached to said intermediate frame, and further wherein said vibratory drive acts upon said conveyer trough via said first spring,
    wherein said intermediate frame is attached to said foundation via said supporting springs, and wherein at least one of said first pre-loaded springs is attached to said articulated joint of said intermediate frame, and further wherein said second pre-loaded springs connect said conveyer trough to said intermediate frame.

11. The resonant vibrating conveyer of claim 10, wherein lines of force of said first pre-loaded springs and said second pre-loaded springs between said conveyer trough and said intermediate frame and between at least one of said plurality of countervibrating masses and said intermediate frame act on a common axis.

12. The resonant vibrating conveyer of claim 10, wherein said vibratory drive is mounted on said intermediate frame and transmits a vibratory motion to said conveyer trough.

13. The resonant vibrating conveyer of claim 10, wherein said vibratory drive is mounted on said intermediate frame and transmits a vibratory motion to said conveyer trough.

14. The resonant vibrating conveyer of claim 10, wherein natural frequencies of two vibrating systems comprising said intermediate frame and said conveyer trough and said intermediate frame and at least one of said countervibrating masses are adjustable independently of each other.

15. The resonant vibrating conveyer of claim 14, wherein a natural frequency of at least one of said plurality of said countervibrating masses can be adjusted to a frequency slightly above a frequency of said vibratory drive.

16. The resonant vibrating conveyer of claim 10, wherein a vibrating behavior of said conveyer trough and of said plurality of countervibrating masses can be adjusted so that said intermediate frame remains virtually at rest when said conveyer is in use.

17. The resonant vibrating conveyer of claim 11, wherein a vibrating behavior of said conveyer trough and of said plurality of countervibrating masses can be adjusted so that said intermediate frame remains virtually at rest when said conveyer is in use.

18. The resonant vibrating conveyer of claim 12, wherein a vibrating behavior of said conveyer trough and of said plurality of countervibrating masses can be adjusted so that said intermediate frame remains virtually at rest when said conveyer is in use.

* * * * *